(12) United States Patent
Bruck

(10) Patent No.: US 7,490,933 B2
(45) Date of Patent: Feb. 17, 2009

(54) HINGELESS EYEGLASSES; ESPECIALLY SAFETY GLASSES

(75) Inventor: Stefan Bruck, Nürnberg (DE)

(73) Assignee: Uvex Arbeitsschutz GmbH, Fürth (DE)

( * ) Notice: Subject to any disclaimer, the term of this patent is extended or adjusted under 35 U.S.C. 154(b) by 265 days.

(21) Appl. No.: 11/449,757

(22) Filed: Jun. 9, 2006

(65) Prior Publication Data

US 2006/0279692 A1    Dec. 14, 2006

(30) Foreign Application Priority Data

Jun. 10, 2005    (DE) .................. 20 2005 009 131 U

(51) Int. Cl.
*G02C 5/00* (2006.01)

(52) U.S. Cl. ........................................ 351/41

(58) Field of Classification Search ............. 351/47, 351/57, 103–109, 111, 153, 155, 41
See application file for complete search history.

(56) References Cited

U.S. PATENT DOCUMENTS

| | | | |
|---|---|---|---|
| 5,386,254 A * | 1/1995 | Kahaney | 351/60 |
| 5,523,805 A | 6/1996 | Kuipers et al. | |
| 5,760,868 A * | 6/1998 | Jannard et al. | 351/153 |
| 5,796,460 A | 8/1998 | Maturaporn | |
| 5,903,331 A | 5/1999 | Lin et al. | |
| 6,908,193 B2 * | 6/2005 | Cyr | 351/103 |

FOREIGN PATENT DOCUMENTS

| | | |
|---|---|---|
| DE | 298 15 895 U 1 | 12/1998 |
| DE | 299 06 003 U 1 | 10/1999 |
| DE | 101 05 930 B4 | 9/2002 |
| DE | 20 2004 002495 U1 | 4/2004 |
| EP | 0 561 763 A1 | 9/1993 |
| WO | 91/17468 A1 | 11/1991 |

OTHER PUBLICATIONS

European Search Report dated Sep. 1, 2006.

* cited by examiner

*Primary Examiner*—Ricky L Mack
*Assistant Examiner*—Vipin M Patel
(74) *Attorney, Agent, or Firm*—Browdy and Neimark, P.L.L.C.

(57) ABSTRACT

In hingeless eyeglasses, especially safety glasses, wherein the temples are formed as one piece with a top frame piece, and the top frame piece has provided on it fastening means for the lens, it is provided, with a view to obtaining cost-effective production, that said fastening means for the lens are injection-molded from plastic in one piece with an intrinsically elastic top frame piece.

7 Claims, 5 Drawing Sheets

HINGELESS EYEGLASSES; ESPECIALLY SAFETY GLASSES

BACKGROUND OF THE INVENTION

1. Field of the Invention

The invention is directed to hingeless eyeglasses, especially safety glasses, wherein the temples are formed as one piece with a top frame piece, and the top frame piece has provided on it fastening means for the lens.

2. Background Art

Eyeglasses of this type are known from EP 0 561 763 A1. For the purpose of mounting the lens, the known eyeglasses have U-shaped holders soldered to them at a top frame piece, with the plug-like legs of the U-shape extending into bores in the lens and being anchored there. This embodiment does not permit an exchanging, or at least not a simple exchanging, of the lens, as it is required especially in the case of safety glasses, and it is time-consuming and expensive especially in its production.

From DE 101 05 930 B4, an eyeglass frame is known that is produced in one piece with temples from a plastic plate material with two enclosed openings for accommodating the lenses, said lenses having grooves and the frame being snappable into place in the grooves of said lenses and securable in this manner. Eyeglasses of this type are not suitable as safety glasses and also do not open up the possibility of an attractive design.

SUMMARY OF THE INVENTION

With this as the starting point, the invention has as its object to improve eyeglasses of the above-mentioned type in such a way that, while providing for a high degree of wearing comfort and ensuring all safety-relevant requirements, they can be produced cost-effectively.

This object is met according to the invention in such a way that the fastening means for the lens are injection-molded from plastic in one piece with an intrinsically elastic top frame.

The production of the temples, top frame piece and fastening means in one piece by injection-molding from plastic results in a very advantageous producibility. The utilized material may be Polyamide 12, for example.

When such a material is used, provision may be made for the temples to extend inward in an arc shape when not worn, optionally overlapping in the rearward region, and to then be bent open for wearing, in such a way that they then elastically rest against the head of the user, ensuring a secure fit. Moreover, the top frame piece exhibits the elastic deformability that is required for the insertion of the lens.

In an additional embodiment of the invention, provision may be made for the temples to extend from the upper frame piece inward in an arc shape when not worn, and to optionally overlap in the end region. This eliminates the need for a hinge with separate parts, thus permitting a cost-effective production, and a secure fit on the head of the user is attained at the same time because of the pretension.

Provision may additionally advantageously be made for the fastening means to have at least two hook-like projections on the top frame piece on both sides of the nose recess that hook over the edge of the eyeglasses, as well as a hook projection formed on a vertical extension of the top frame piece in the nose region that can be snapped into place in a nose recess of the lens.

The lens in this case advantageously has at its upper edge U-shaped recesses, which are dimensioned such that they enclose in a form-fitting manner the protrusions of the hook-like projections that extend away from the top frame piece, the lateral edge of these recesses, in turn, having a transversely extending section at the front end of the protrusions hooking over them.

The above-described manner of joining the lens and top frame piece is not only advantageous from a production point of view, but it additionally has the very significant advantage for safety glasses that the lens has a certain amount of play relative to the top frame piece, whereby the energy from particles can be absorbed that strike the outside of the lens. Eyeglasses of this type accordingly meet the requirements regarding bombardment resistance in accordance with European standard EN 166 F—bombardment 45 m/sec.

The fastening means may additionally comprise projections formed on the top frame piece in the region of the lateral outer edge of the lens, which hook over the lateral upper edge of the lenses in their inserted state.

Provision is advantageously made in this case for the lens to have recesses in the region of the lateral projections of the top frame piece, said recesses corresponding to the projections in a form-fitting manner.

The lateral limiting walls of the U-shaped recesses may extend in a direction perpendicular to the face plane, thus permitting an easy removal from the mold during the injection-molding process of the lens.

The nose bridge and temple end are advantageously produced in the two-component counter-current injection molding process from a softer plastic in order to increase the wearing comfort. This production technique permits the temples and frame to be formed in one piece and to nonetheless adapt the hardness in the respective region to the requirements.

The temples have a box shape in cross-section, such that the height is noticeably greater than the depth, so that a sufficient degree of rigidity is attained on one hand, but that it is also possible, on the other hand, to bend the eyeglasses inward by 180° so that the eyeglasses can be stored in an eyeglass case or placed in a pocket for safekeeping. The cross-sectional shape of the frame or temples, respectively, varies at different points, in order to thus attain, for example in the "hinge region", i.e., in the region laterally of the lens a sufficiently high degree of flexibility for the bending of the temples.

The invention is also directed to a method for fastening a one-piece lens to a one-piece frame piece that has hook-like projections laterally of the nose region, a hook projection in the nose region, and two lateral projections that hook over the outer edge of the lens, provision being made for the lens to be bent into an arc-shape for the purpose of fastening it to the frame piece, thereby reducing its width, and to be pushed with its outer edge under the lateral projections, for the lens to then be pivoted to come to rest under the projections laterally of the nose region, and lastly for the hook projection to be snapped into place in the region of the nose recess of the lens.

The invention will be described in more detail below with the aid of a preferred embodiment, in conjunction with the drawing.

DESCRIPTION OF A PREFERRED EMBODIMENT

Figure 1:
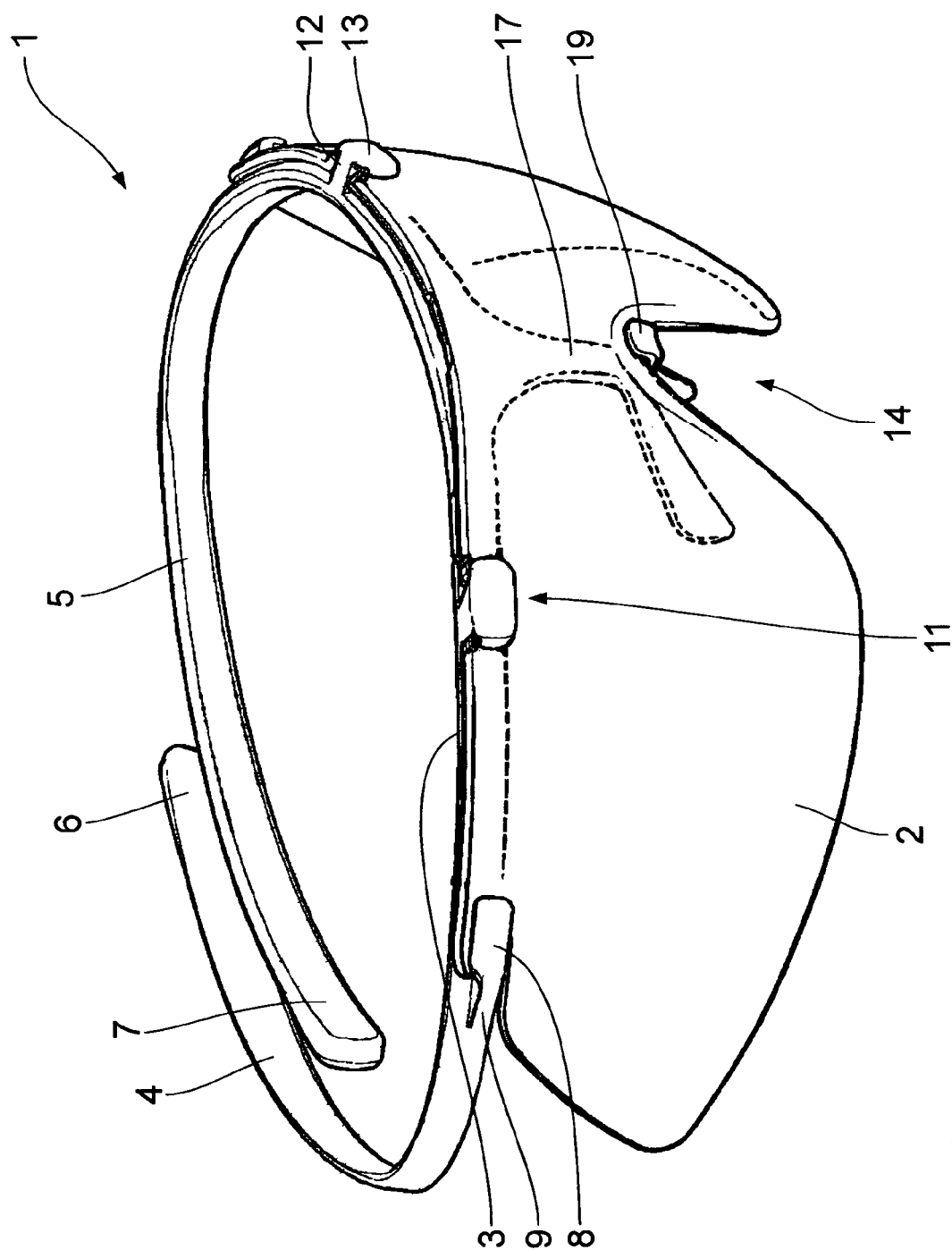
FIG. 1 shows a perspective view of an assembled and ready-to-use pair of inventive eye glasses.

A pair of eyeglasses 1 shown in the drawing comprises a one-piece continuous lens 2, a top frame piece 3, and injection-molded thereon in one piece, temples 4, 5 that extend away from the top frame piece inwardly curved in an arc shape and overlapping in the respective end region 6, 7.

The top frame piece 3 has lateral projections 8 injection-molded in one piece with the former, which are connected via a tapered bridge 9 to the frame piece 3.

Provided on both sides of the nose region 10 on the top frame piece 3 are hook-like projections 11, which comprise protrusions 12 extending away from the frame piece 3 and, disposed at their outer ends, sections 13 extending parallel with the top frame piece 3.

The lens 2 has a nose recess 14 and on both sides of it U-shaped recesses 15, which are dimensioned such that they hook around the protrusions 12 of the hook-like projections 11, and which, in turn, have the section 13 of the hook-like projections 11 hooking over them along their vertical edge.

Additionally provided on the lens 2 are lateral recesses 16 that hook over the bridge 9 of the projections 8, and which, in turn, have the projections 8 hooking over them, as it is apparent from FIG. 1.

Extending downward in one piece with the frame piece 3 from the nose region 14 is a vertical extension 17, at the lower end of which nose pads 18 and a hook projection 19 are formed. The latter, in the inserted state of the lens 2, hooks over the upper region of the nose recess 14.

Figure 2:
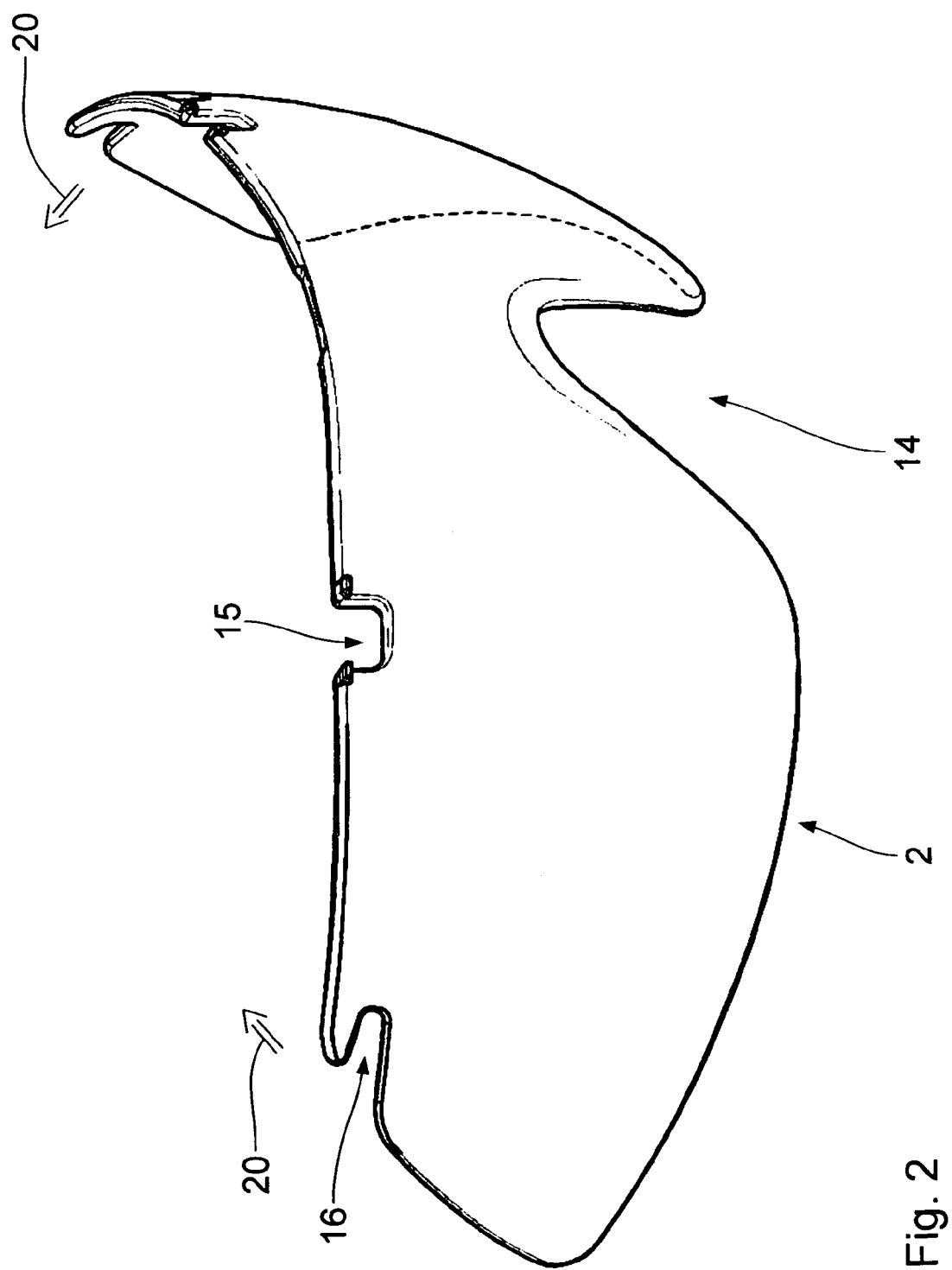
FIG. 2 shows a perspective view of the lens.
Figure 3:
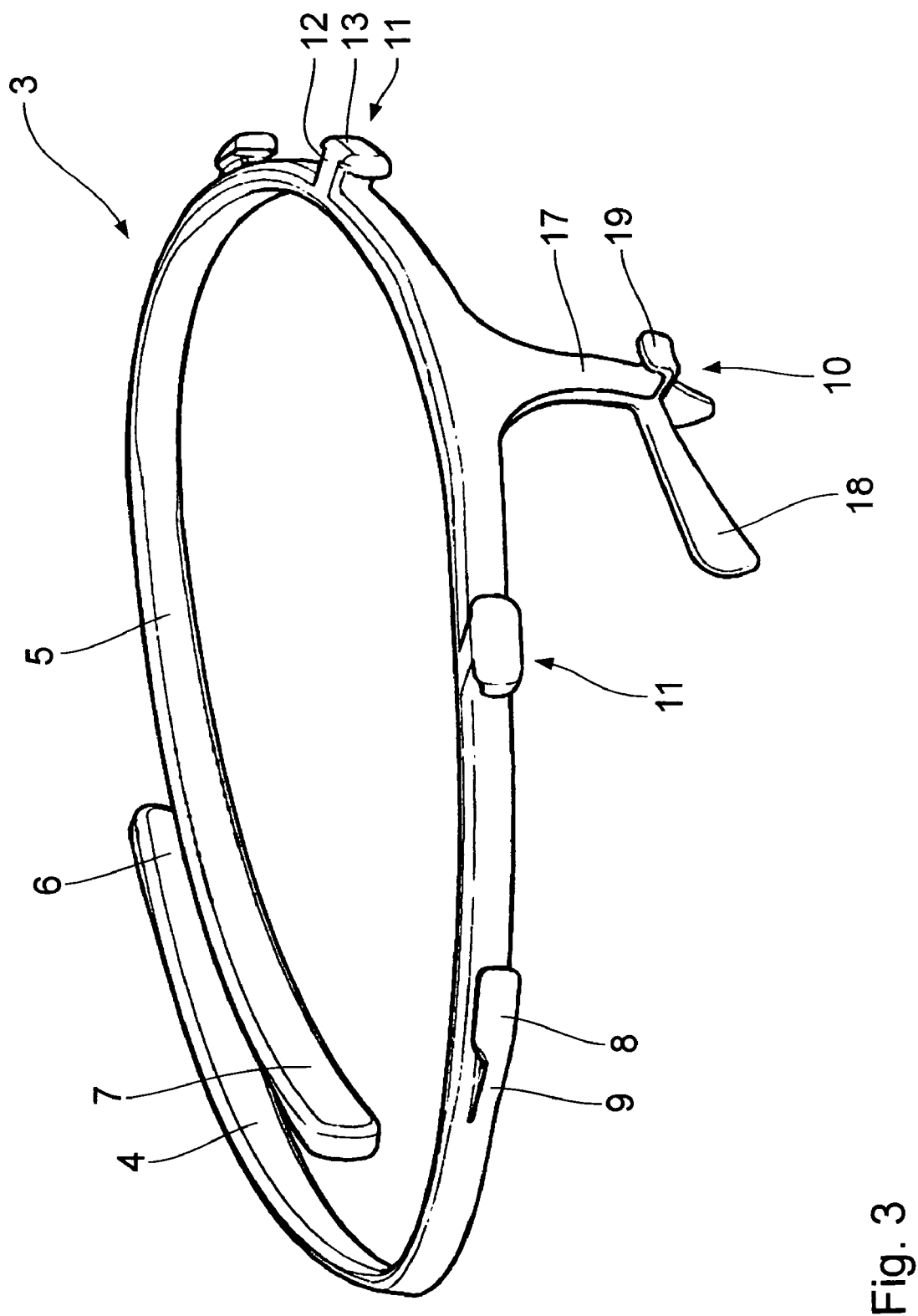
FIG. 3 shows a perspective view of the top frame piece and temples.
Figure 4:
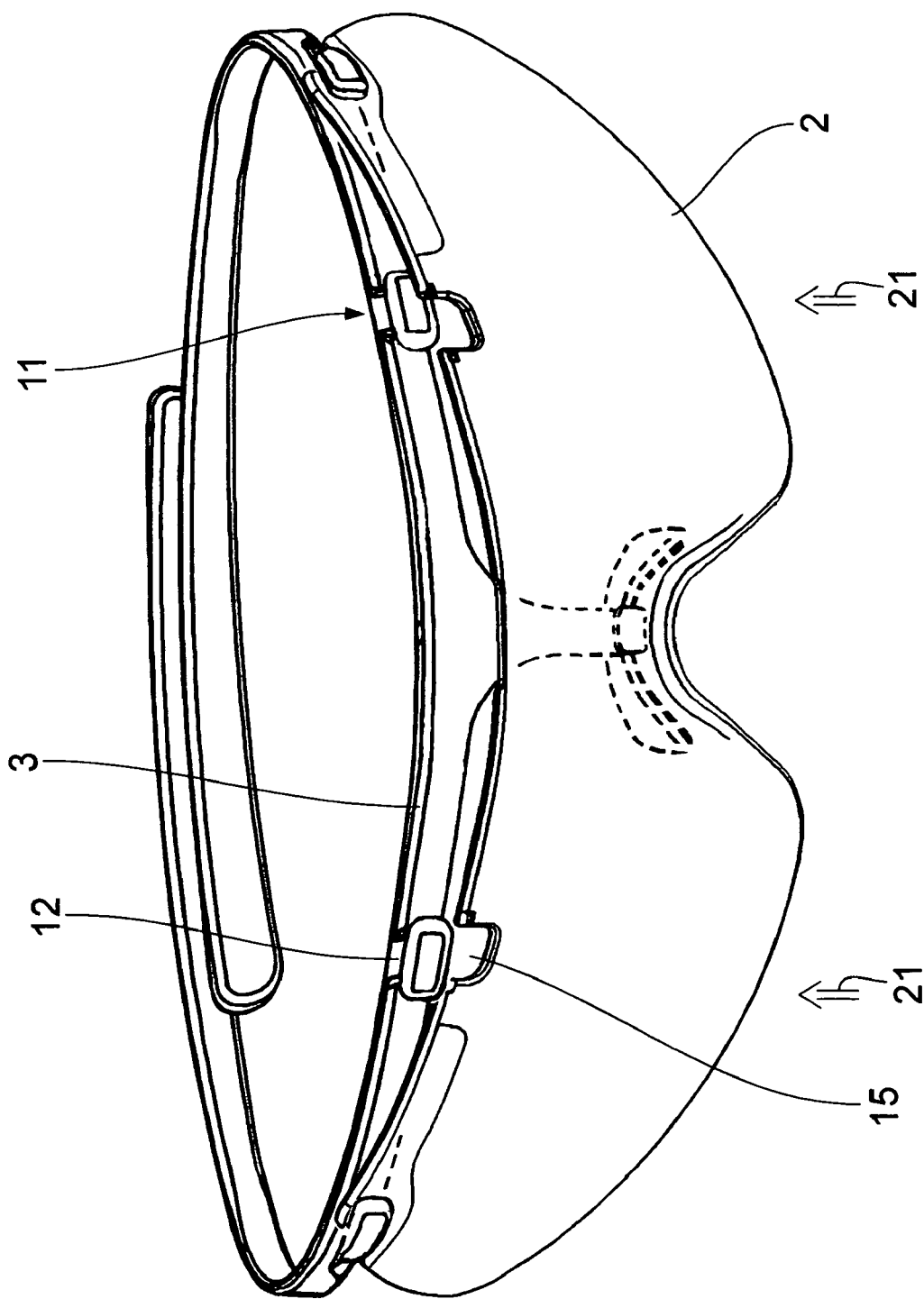
FIG. 4 shows the frame piece and lens in a pre-assembled state.

Proceeding from the disassembled state shown in FIG. 2 and 3 of the frame piece 3 on one hand and lens 2 on the other hand, mounting of the lens 2 takes place as follows:

The lens 2 is bent slightly further inward in its outer regions into an arc shape, in the direction of the arrows 20 (see FIG. 2), so that its actual length is shortened. It is now possible to push the lateral recesses 16 under the projections 8 and over the bridges 9 of the projections 8, so that the state shown in FIG. 4 is attained.

Proceeding from here, the lens 2 is pivoted upward relative to the frame 3 so that the U-shaped recesses 15 hook over the protrusions 12 of the projections 11 and the sections 13 hook over the lateral outer edges of the recesses 15.

Figure 5:
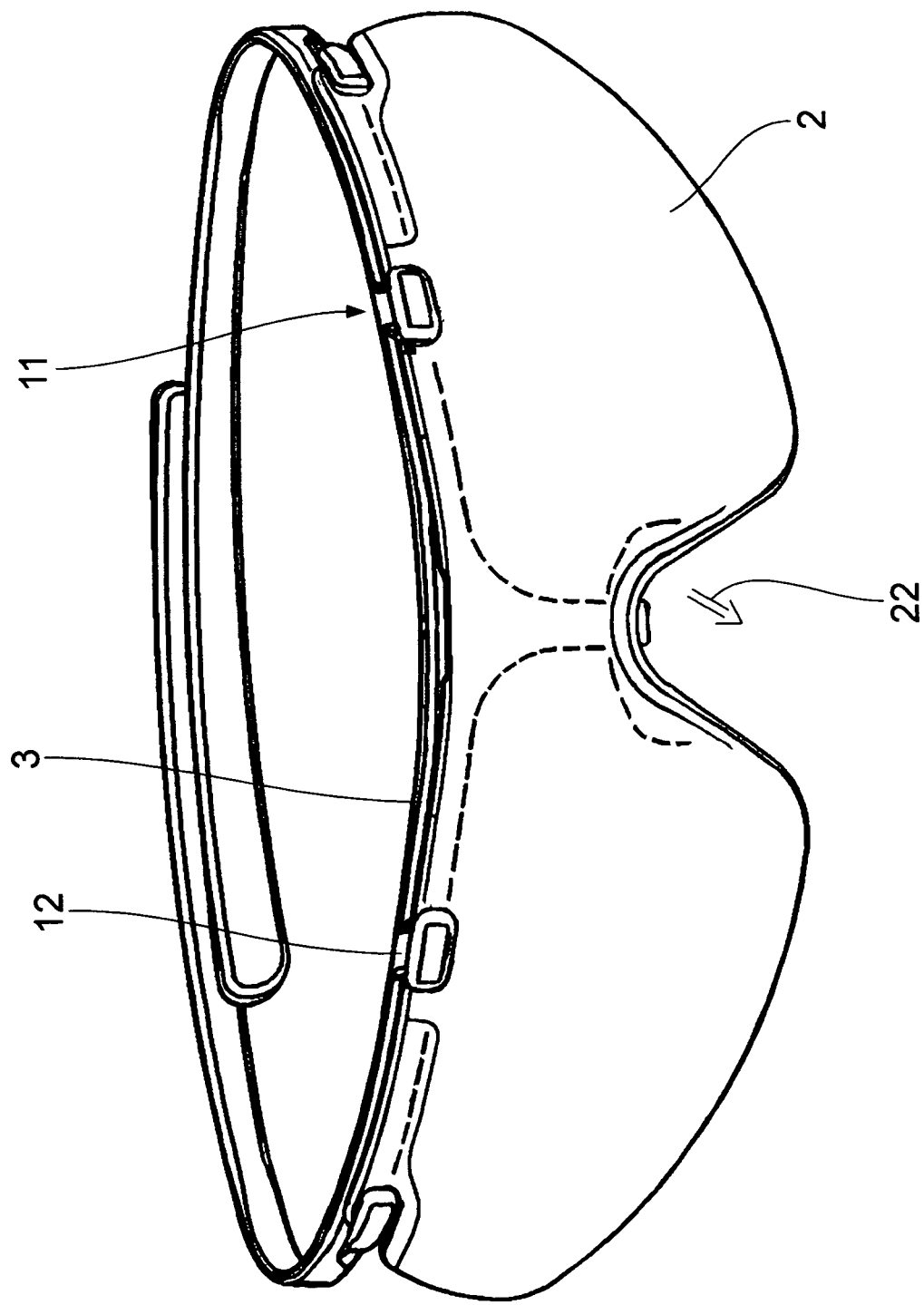
FIG. 5 shows the frame piece and lens in an assembly step following FIG. 4.

Proceeding from this state, which is shown in FIG. 5, the hook projection 19 in the nose region is then pivoted forward out of the drawing plane together with the extension 17 in the direction of the arrow 22, so that, as shown in FIG. 1, the hook projection 19 snaps into place above the nose recess 14.

What is claimed is:

1. Hingeless eyeglasses, especially safety glasses, wherein the temples are formed as one piece with a top frame piece, and the top frame piece has provided on it fastening means for the lens, wherein said fastening means for the lens (2) are injunction-molded from plastic in one piece with an intrinsically elastic tip frame piece (3);

wherein the fastening means comprise at least two hook-like projections (11) on the top frame piece that hook over the edge of the eyeglasses, and, formed on a downwardly projecting vertical extension (17) of the top frame piece in the nose region, a hook projection (19) that can be snapped into place in a nose recess (14) of the lens (2);

wherein the top frame, the vertical extension and the hook projection are of one-piece.

2. Eyeglasses according to claim 1, wherein, when not worn, the templates (4, 5) extend inward from the top frame piece (3) in an arc shape.

3. Eyeglasses according to claim 1, wherein the lens has at its upper edge U-shaped recesses (15) that are dimensioned such that they hook in a form-fitting manner over the protrusions (12) of the hook-like projections that extend away from the top frame piece (3), the lateral edge of the recesses, in turn, having a transversely extending section (13) on the front end of the protrusions (12) hooking over it.

4. Eyeglasses according to claim 1, wherein in the region of the lateral outer edge of the lens (2), the top frame piece (3) has provided on it projections (8) that hook over the lateral upper edge of the lens (2) in its inserted state.

5. Eyeglasses according to claim 4, wherein in the region of the lateral projections (8) of the top frame piece (3), the lens (2) has recesses (16) that correspond to the projections (8) in a form-fitting manner.

6. Eyeglasses according to claim 3, wherein the lateral limiting walls of the U-shaped recesses (15) extend in a direction perpendicular to the face plane.

7. A method for fastening a one-piece lens to a one-piece frame piece having hook-like projections laterally of the nose region, having a hook projection in the nose region, and having two lateral projections hooked over the outer edge of the lens, wherein the lens (2), for the purpose of fastening it to the frame piece (3) is bent into an arc-shape, thereby reducing is width, and inserted with the outer edge under said lateral projections (8), that the lens (2) is then pivoted to come to rest under the projections (8) laterally of the nose region, and that, lastly, the hook projection (19) is snapped into place in the region of the nose recess (14) of the lens (2).

\* \* \* \* \*